Fig. 1.

Nov. 7, 1972   S. E. HIGHLAND   3,702,124
TRAVERSING SKIPS

Filed July 20, 1970   8 Sheets-Sheet 2

INVENTOR
STANLEY E. HIGHLAND
BY
Featherstonhaugh & Co.
ATTORNEYS United States Patent Office 3,702,124
Patented Nov. 7, 1972

3,702,124
TRAVERSING SKIPS
Stanley E. Highland, 316 Wellington Ave.,
Chilliwack, British Columbia, Canada
Filed July 20, 1970, Ser. No. 56,282
Int. Cl. B61b 7/06; E01b 25/16; E04g 3/16
U.S. Cl. 182—14
34 Claims

ABSTRACT OF THE DISCLOSURE

A movable skip adapted to be removably mounted on power lines and the like and to carry a man who can pull the skip along the lines or operate a motor to run the skip therealong. The skip includes a cage for carrying the operator, and suspension means for maintaining the cage level when the remainder of the skip is not level due to the position of the lines. The skip has supporting pulleys adapted to move along the lines, and the arrangement is such that the operator can use his weight to help lift the pulleys successively over any hardware connected to the lines.

This invention relates to skips for power lines and the like, for moving men along the lines for repair, maintenance and other purposes.

There are skips in existence by means of which men can be moved along power or transmission lines, but many of these are relatively large, heavy and awkward to handle or manipulate. There are some lighter types, but these have limited use, and can be used only on lines where the wires are level. It is very difficult to get the known skips around hardware connected to the lines. All in all, the prior skips are not very satisfactory.

A skip made in accordance with the present invention is very simple in construction, light in weight and easy to handle. It can travel along level lines or lines having gradients up to about 30° without any difficulty. The preferred form of skip is such that it is mounted on two substantially parallel cables or lines, and it will travel on longitudinally curved lines without difficulty. As the skip travels on inclined lines or curved lines it tends to tip longitudinally or laterally, and this skip has means operable by the man in it to keep the cage in which he stands substantially level at these times. The skip can have a weight of approximately 60 lbs. as compared to 600 to 1100 pounds for the prior powered skips. The skip is mounted on the lines by means of pulleys, and its construction is such that the operator can use his weight to tip the skip to lift some of the pulleys off the lines while they are being moved past obstacles such as insulation strings, spacers, vibration dampers, splices, angle towers, and the like.

A skip according to the present invention comprises supporting means having pulley means thereon adapted to ride on one or two lines. A cage for carrying an operator is connected to the supporting means by cable means. The cable means can be shortened and lengthened to maintain the cage substantially level when the line or lines are not level. Suitable brakes on the skip are operable to prevent movement of the skip along the cable means. The pulley means are preferably located relative to the cage so that the operator can use his weight to tip the skip and lift some of the pulley means off the cable means while he moves the skip to shift the raised pulley means past obstructions on the lines.

Skips in accordance with the present invention are illustrated in the accompanying drawings, in which FIG. 9 is a diagrammatic end elevation of the skip on parallel lines.

Referring to FIGS. 1 to 11 of the drawings, 10 is a skip in accordance with the present invention mounted on line means which in this example consists of a pair of power lines or cables 12 and 13. The skip itself consists of a supporting frame 16 carrying a cage 18 positioned therebeneathed. Although frame 16 may be formed as a single unit, it is preferably formed of independent side members 20 and 21 which extend substantially parallel to each other. Cage 17 includes a floor 23, ends 24 and 25, and sides 27 and 28. The cage is made as light as possible, and in the illustrated example, the ends and sides are formed of spaced-apart tubes, formed of light metal. If desired, the cage may be made of flat bars and angle irons bolted together in order that it can be knocked down for transportation and storage.

Suitable cable means is provided for connecting cage 17 to supporting frame 16 so that the cage can be tipped longitudinally and laterally relative to the frame. Side member 20 has curved cable bearings or guides 32 and 33 mounted thereon adjacent opposite ends thereof, while side member 21 has curved cable bearings or guides 35 and 36 mounted adjacent its opposite ends. The ends 24 and 25 of the cage have cross members 39 and 40 forming the upper edges thereof, and member 39 has pulleys 42 and 43 thereon, while cross member 40 has pulleys 45 and 46 thereon. A cable 50 extends along side member 20 and through guide 32 of said side member, downwardly and under pulleys 42 and 43 of cross member 39 of the cage, up through guide 35 of side member 21 and along the latter. The effective length of cable 50 between frame 16 and cage 17 is adjustable, and this can be done in any suitable way. The ends of the cable can be wound on drums or, as shown, snap hooks 51 are connected to the cable ends so as to removably connect said ends to any one of spaced-apart anchors or bars 52 on side members 20 and 21, see FIG. 3. Similarly, a cable 56 extends along side member 20 and through guide 33, under pulleys 45 and 46 of cross member 40 of the cage, upwardly through guide 36 of side member 21 and along the latter. Cable 56 has snap hooks 57 on its ends to connect said ends to anchor bars 52 of the side members. If cable 50 is effectively shortened or lengthened, the adjacent end of cage 17 is moved towards or away from frame 16. If cable 56 is effectively shortened or lengthened, the opposite end of the cage is moved towards or away from the frame.

Clamps 63 and 64 are provided on cross members 39 and 40 to releasably grip the portions of cables 50 and 56 extending along said members.

Pulley means are provided for supporting skip 10 on the cables 12 and 13. In this example, side member 20 has arms 65 and 66 projecting upwardly therefrom near but spaced inwardly from its opposite ends. Arms 65 and 66 have pulleys 67 and 68 rotatably mounted on upper ends thereof and adapted to ride on cable 12. Side member 21 has arms 70 an 71 projecting upwardly therefrom carrying pulleys 72 and 73, said arms and pulleys being near but spaced inwardly from the ends of this side member.

Suitable brake means is provided for skip 10. In this example, brakes 76 and 77 are provided adjacent pulleys 67 and 72. Only two brakes have been shown in this example, but there may be four, one near each of the pulleys on cables 12 and 13. If desired, brakes 76 and 77 may be shiftable from the position near pulleys 67 and 72, as shown, to positions adjacent pulleys 68 and 73. As these brakes are identical, only one, namely brake 77, will be described herein.

Brake 77 is an example of a type of brake that can be used with this skip. The brake includes a body 79 swingably connected to the side of arm 70 in any convenient manner. In this example, a shaft 80 projects laterally from arm 70 through the lower portion of body 79, and is threaded on its outer end to reecive nuts 81 and 82. Nut 81 holds the brake body in position while allowing it to swing around shaft 80, while nut 82 locks the other nut in place. Supports 85 and 86 project outwardly from body 79, and a block 87 is slidably mounted between these supports. A shaft 89 extends through and is rotatably mounted in body 79, and has a threaded section 90 extending through and threaded in block 87 so that rotation of shaft 89 shifts the block back and forth between supports 85 and 86. A crank is mounted on the outer end of shaft 89, and in this example, the crank is in the form of a pulley 92 having a handle 93 projecting outwardly therefrom near its periphery.

A pair of jaws 95 and 96 are swingably mounted on supports 85 and 86, and have opposed brake shoes 97 and 98, respectively, near their lower ends. These shoes have concave inner surfaces 101 and 102 shaped to fit around the portion of cable 13 extending therebetween. Jaw 95 has side arms 104 overlapping the sides of supports 85 and 86, said arms being swingably mounted on support 86 by a pin 105. Pins 106 projecting laterally from block 87 extend through slots 107 in and extending longitudinally of side arms 104. Similarly, jaw 96 has side arms 110 overlapping the sides of supports 85 and 86, and pivotally connected to support 85 by pin 111. Pins 112 projecting laterally from block 87 extend through slot 113 in arms 110.

Figure 4:
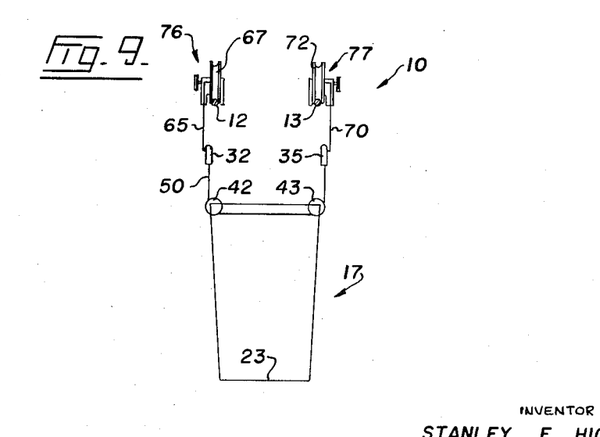
FIG. 4 is an enlarged sectional view taken on the line 4—4 of FIG. 2, showing in elevation one form of a brake for the skip.
Figure 5:
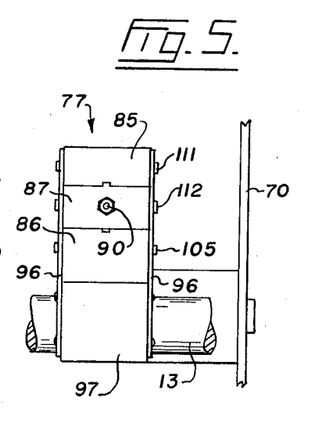
FIG. 5 is an elevation of the inboard end of the brake of FIG. 4.
Figure 6:
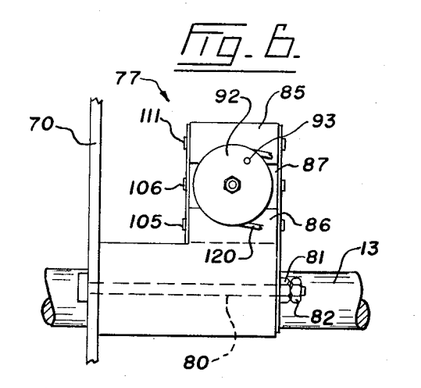
FIG. 6 is an elevation of the outboard end of said brake.

When brake 77 is in operative position, as shown in FIGS. 4, 5 and 6, support 86 rests on a bracket 116 projecting laterally from arm 70. The brake can be moved out of operative position by swinging it outwardly around shaft 80, at which time body 79 rests upon another bracket 118 projecting from arm 70, as shown in broken lines in FIG. 4.

When brake 76 and 77 are in operative position, they can be applied to cables 12 and 13 to prevent movement of the skip therealong by rotating pulleys 92 by means of handles 93. If desired, a cable 120 may be wound on each of the pulleys 92 and extended along the adjacent side member of frame 20 to be hooked onto one of the anchor bars 52. Cables 120 will permit the operator to apply brakes 76 and 77 when he is standing adjacent the opposite end of the skip.

When pulley 92 of brake 77 is rotated in one direction, block 87 is moved outwardly towards brake body 79 causing arms 104 and 110 to swing about their respective pivot pins 105 and 111 to press brake shoes 100 and 101 against cable 13, thereby applying the brake. When pulley 92 is rotated in the opposite direction, block 87 is moved inwardly with respect to body 79 to pivot arms 104 and 110 to move the brake shoes away from the cable. If it is desired to clear the brake away from the cable, it is swung around its shaft 80 until it rests on bracket 118.

Figure 1:
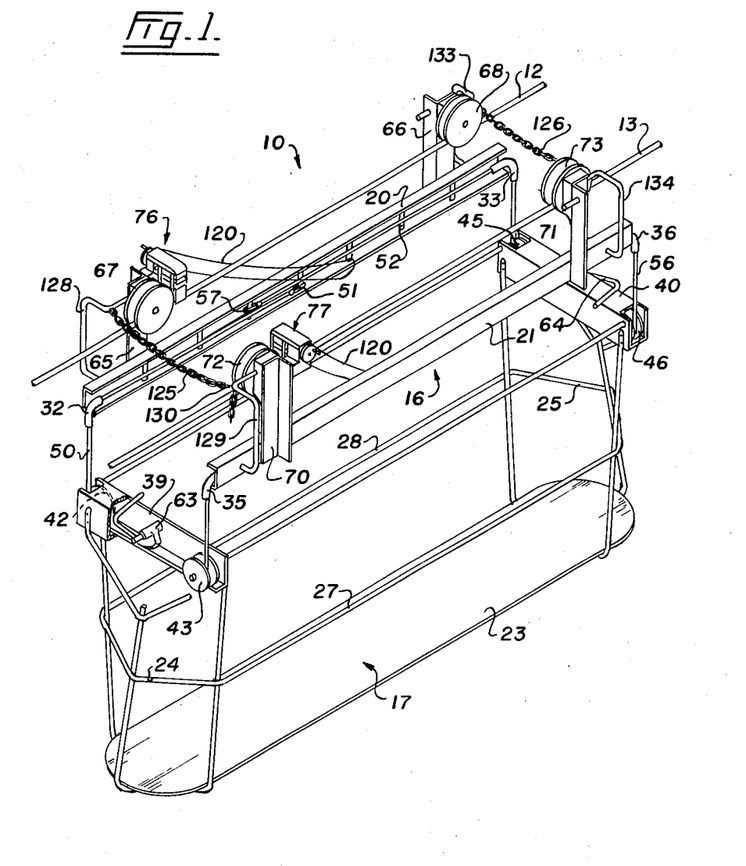
FIG. 1 is a perspective view of one form of the skip on transmission lines or cables.
Figure 2:
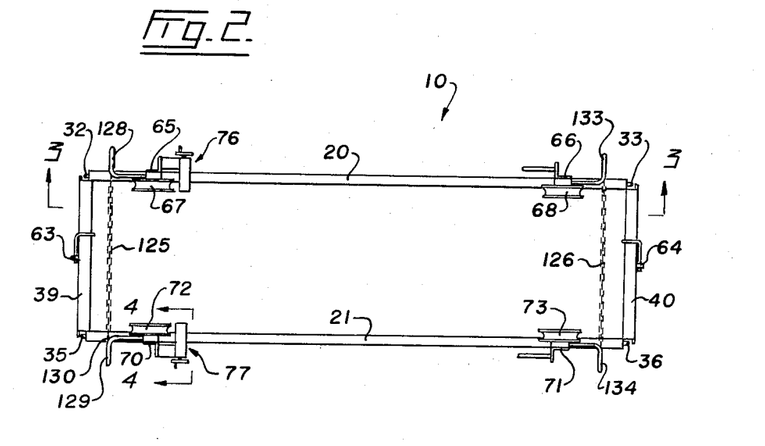
FIG. 2 is a plan view of the skip with the power lines omitted.
Figure 3:
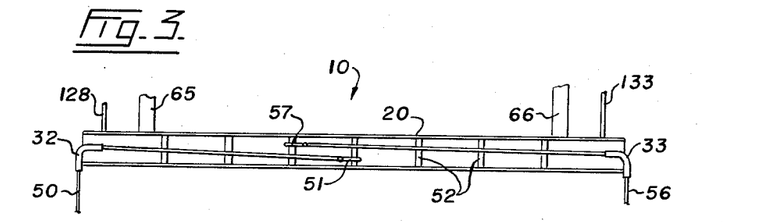
FIG. 3 is a fragmentary section taken on the line 3—3 of FIG. 2.

When cables 12 and 13 are substantially level both longitudinally and laterally, skip 10 is set up in the manner shown in FIG. 1. Pulleys 67, 68 and 72, 73 rest respectively on cables 12 and 13. Brakes 76 and 77 are in their normal operative positions with the shoes thereof spanning lines 12 and 13. Cables 50 and 56 are adjusted so that cage 17 is suspended horizontally beneath side members 20 and 21 of supporting frame 16. A man standing in cage 17 is positioned between side members 20 and 21 and the cables 12 and 13. Safety cross straps or chains 125 and 126 are preferably provided at the opposite ends of the skip. In this example, standards 128 and 129 project upwardly from adjacent ends of side members 20 and 21, and chain 125 extends between the upper ends of these standards. One end of the chain may be permanently secured to standard 128, while the opposite end is removably connected to standard 129. For example, a link of the chain can be placed over a hook 130. Similarly, cross chain 126 is connected to the upper ends of standards 133 and 134 projecting upwardly from the side members adjacent the opposite ends thereof. Chains 125 and 126 extend across the skip above cables 12 and 13 to provide additional protection against the skip accidentally coming off the cables, and they help to keep the operator in the cage when he moves back and forth therein.

In order to move along cables 12 and 13, the operator can grip them with his hands between the skip pulleys riding thereon and so pull himself along the cable. If desired, a small motor unit, not shown, can be connected to cage 17 or supporting frame 16 to drive the skip along the cables.

Figure 7:
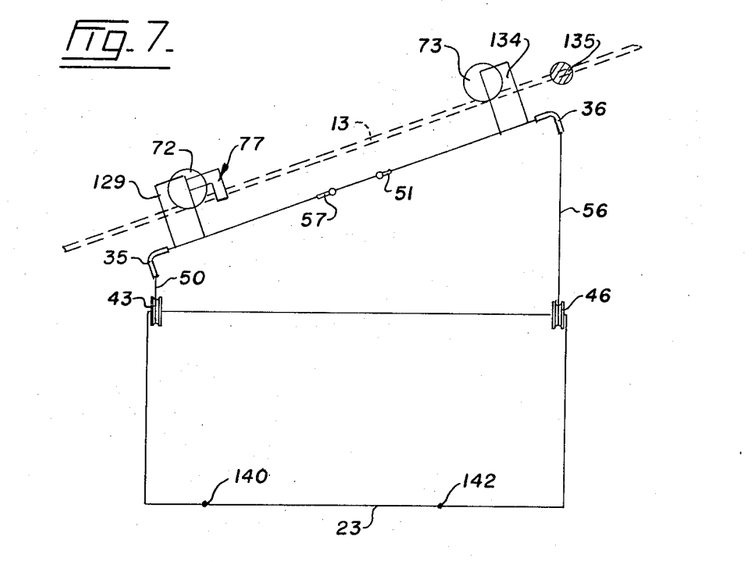
FIG. 7 is a diagram showing this skip on inclined lines, FIG. 8 digrammatically illustrates the skip being tilted so as to pass hardware connected to the lines.
Figure 8:
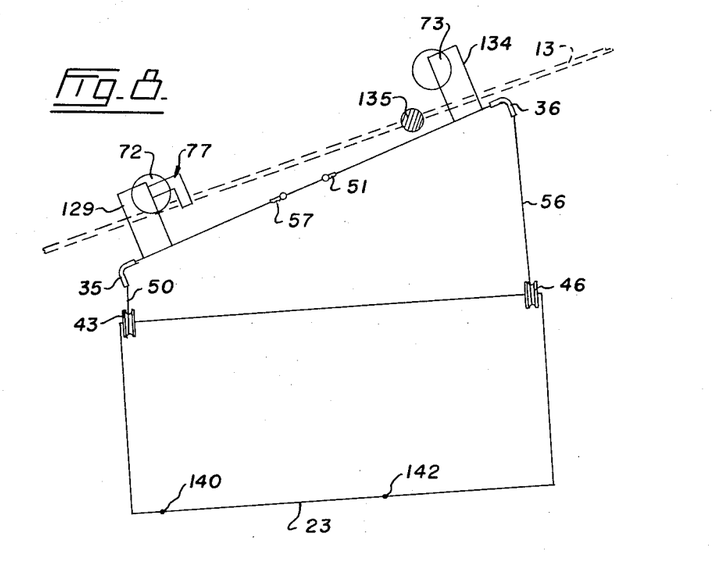

If the skip is moving along cables that are upwardly inclined, as shown in FIG. 7, the operator can shift either or both of hooks 51 along the adjacent frame side so as effectively to shorten cable 50. If necessary, cable 56 can be effectively lengthened by shifting either or both of hooks 57 along the side members. This results in cage 17 remaining substantially level, as shown in FIG. 7. If the carriage is moving along downwardly inclined cables, cable 56 will be shortened and, if necessary, cable 50 lengthened to tilt the cage in the opposite direction.

Figures 10, 11, 12:
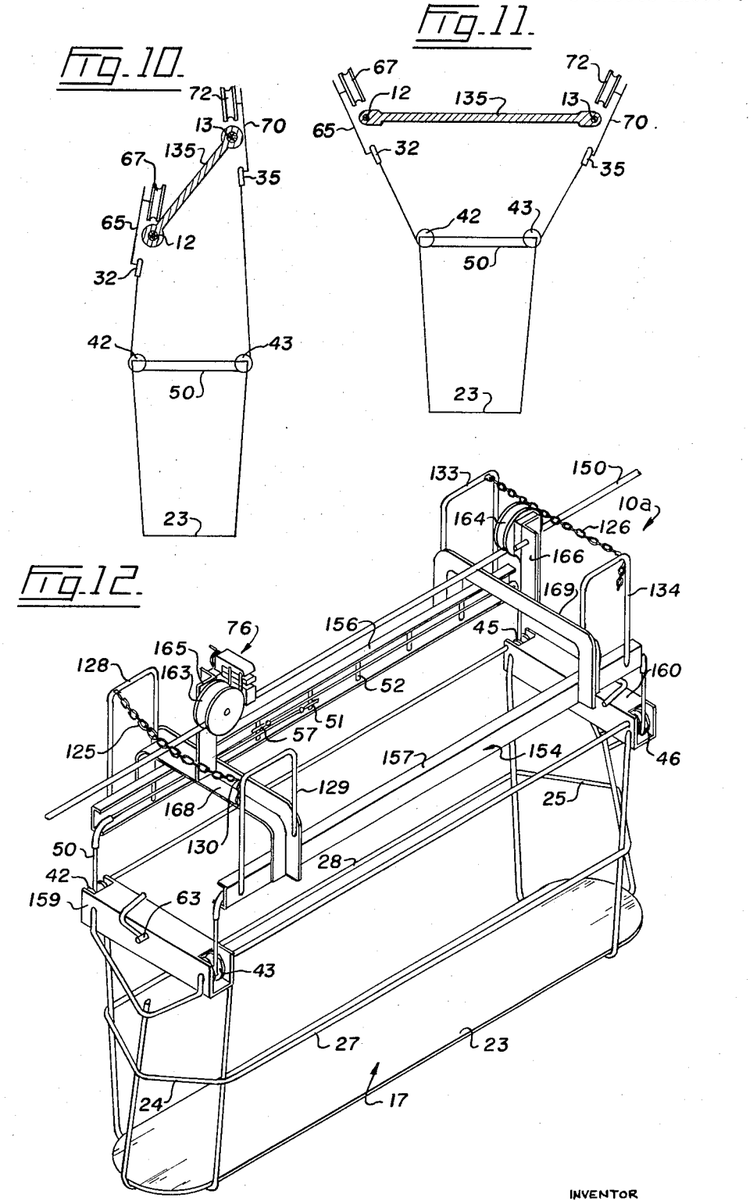
FIG. 10 is a diagrammatic end elevation of the skip on a pair of lines, one of which is higher than the other as when the lines are extending around a curve.
FIG. 11 is a diagrammatic end elevation of the skip on lines that have been spread apart further than usual.
FIG. 12 is a view similar to FIG. 1 of an alternative form of skip.

When cables 12 and 13 extend around a curve, one cable is higher than the other, as shown in FIG. 10, and the weight of the operator keeps the cage level as cables 50 and 56 run around pulleys 42, 43, 45 and 46. If necessary, the effective length of both of these cables can be lengthened at this time. If cables 12 and 13 are abnormally spread apart, as shown in FIG. 11, safety chains 125 and 126 are lengthened so that side members 20 and 21 can move away from each other to enable the pulleys to follow the cables.

If the skip meets an obstruction on the lines while moving upgrade, such as a spreader 135, the operator, after moving brakes 76 and 77 to their inoperative positions, shifts his weight to the back of cage 17 so as to lift the front pulleys 68 and 73 off the cables. The balance point of the skip at this time is indicated at 140 in FIG. 8. By grasping the cables, he pulls the skip forwardly until the raised pulleys are past the obstruction, at which time they are returned to the cables. The operator then pulls the skip until he is as close as possible to the obstruction, after which he applies brakes 76 and 77, and moves forwardly in the skip underneath and past the obstruction. He now reaches back to release the brakes, and applies his weight to the front end of the skip to lift back pulleys 67 and 72 off the cables. The balance point of the skip at this time is at 142. He moves the skip forwardly until the raised pulleys are past the obstruction, and after returning these pulleys to the cables, the operator is ready to continue to travel along the cables. Balance point 140 and 142 are directly beneath pulleys 67, 72 and 68, 73, respectively. Thus, a single man in the skip can easily manoeuvre it so as to pass obstructions on the transmission lines. He does not need help from anyone on the ground or on adjacent towers.

If the operator would like to have brakes 76 and 77 mounted near the opposite end of the skip, all he needs to do is to remove nuts 81 and 82, pull the brakes off their respective shafts 80, and to move the brakes on to the shafts 80 if the supporting arms at said opposite end of the skip.

Skip 10 can be made very strong without unduly increasing its weight. As stated above, cage 17 is formed of light metal tubes or the like, and these can be spaced apart, as shown, so that relatively few of these elements are required while providing sufficient protection for the man in the cage. The supporting frame is made up mainly of the two side members 20 and 21, and these are relatively light. The remaining elements, such as the supporting pulleys and the supporting arms thereof, are not heavy and do not unduly increase the skip weight.

FIG. 12 shows a skip 10a that is a modification of skip 10. Skip 10a is intended for a single line or cable 150. In this case, a supporting frame 154 is made in a single unit having side members 156 and 157 and transverse members 159 and 160 connected thereto. Pulleys 163 and 164 are rotatably mounted on the upper ends of arms 165 and 166 that project upwardly from yokes 168 and 169 that are mounted on and project upwardly from frame 154 near but spaced inwardly from the opposite ends thereof. With this arrangement it is only necessary to tilt cage 17 longitudinally relative to supporting frame 154 since the only inclination results from cable 150 being inclined relative to the ground.

Skip 10a is operated in substantially the same manner as skip 10. The main difference being that the man in cage 17 is positioned beneath cable 150 and has to reach up to it to pull the skip therealong.

FIGS. 13 to 17 illustrate another alternative form of skip 175 mounted on cables 12 and 13. This skip is basically the same as the above-described skips, but in some ways it is an improvement and, therefore, it is the preferred form of the invention.

Skip 175 includes a supporting frame 178 and a cage 180 suspended therebelow. Frame 178 is made up of independent side members 182 and 183. Side member 182 has upper and lower substantially horizontal bars 185 and 186 with vertical supporting arms 187 and 188 interconnecting these bars. The lower ends of arms 187 and 188 are swingably connected to bar 186 by pins 190 and 191, said arms being swingable longitudinally of frame 178, and being spaced inwardly from adjacent ends of said frame. Arms 187 and 188 are releasably connected to upper bars 185 by removable pins 192 and 193, said pins extending through vertical slots in their respective arms into any one of a plurality of holes 194 and 195 respectively, in bar 185. Pulleys 198 and 199 are mounted on the upper ends of these vertical arms and are adapted to ride on cable 12.

Similarly, side member 183 is made up of horizontal upper and lower bars 202 and 203 which are connected together by vertical supporting arms 205 and 206. Arms 205 and 206 are swingably connected to lower bar 203 by pins 208 and 209, and are releasably connected to upper bar 202 by removable pins 210 and 211. Pulleys 213 and 214 are mounted on the upper ends of these arms and are adapted to ride on cable 13.

Cage 180 is connected to supporting frame 178 by means of a continuous cable 220, the ends of which are adjustably connected to the frame in any desired manner. In this example, cable 220 has a hook 222 at one end adapted to hook into any one of a number of holes 223 in side bar 186. This cable extends from the hook through a bearing tube 225 at the lower end of arm 187, whence it extends downwardly through a loop 226 in one side of cage 180, around pulleys 227 and 228 mounted on the adjacent end of the cage, upwardly through loop 230 on the opposite side of the cage, through a bearing tube 231 at the lower end of arm 205, along the inner surface of side bar 203 through another bearing tube 233 at the lower end of arm 206, downwardly through a loop 234 in the cage, around pulleys 235 and 236 at the bottom of the opposite end thereof, upwardly through a loop 238, and through a bent bearing tube 240 at the lower end of arm 188 and along the inner surface of side bar 186. This end of the cable has a hook 243 adapted to hook into anyone of a plurality of holes 244 in said bar 186. A clamp 248 is mounted on the inner surface of bar 203 in order releasably to grip the portion of cable 220 which extends along the inner surface of said bar.

Figure 13:
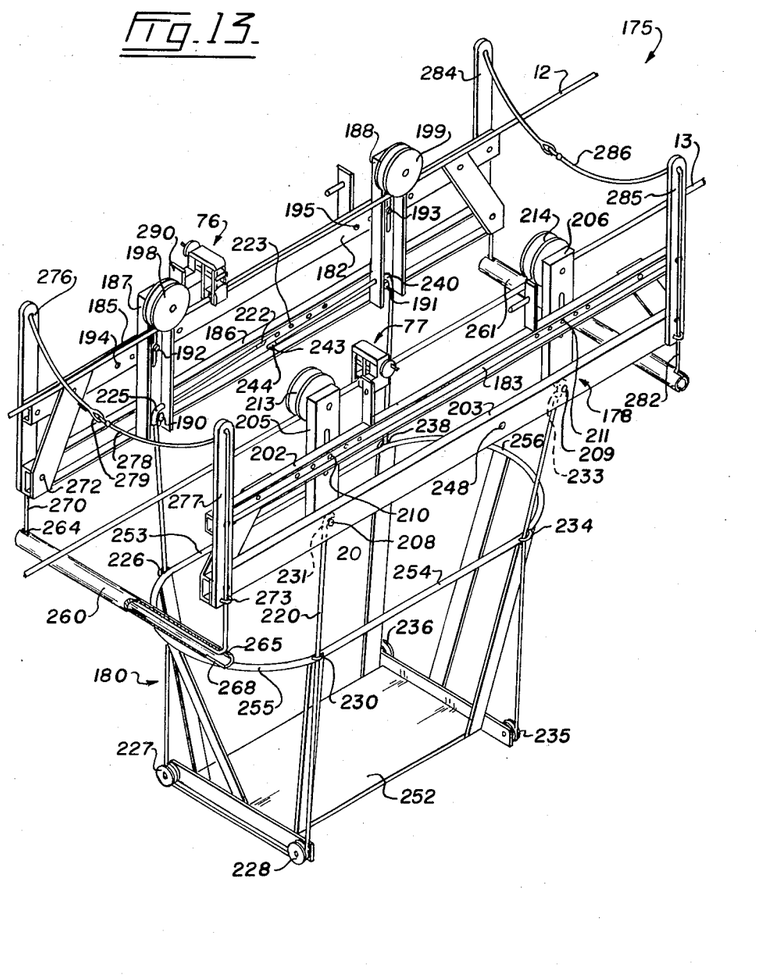
FIG. 13 is a view similar to FIG. 1 of another alternative form of skip on inclined lines and which is a preferred form of the invention.

Cage 180 has a floor 252, side rails 253 and 254, and end end rails 255 and 256, each of said end rails preferably curving outwardly beyond the adjacent end of floor 252, as clearly shown in FIG. 13.

Pressure bars or tubes 260 and 261 are located at opposite ends of supporting frame 178 below the level of lower side bars 186 and 203. Bar 260 has a pair of short slots 264 and 265 therein opening outwardly from opposite ends thereof, and another pair of relatively long slots 267 and 268 circumferentially spaced from said slots 264 and 265. Slots 264 and 265 can be seen in FIG. 13, and slots 267 and 268 in FIG. 17. A supporting cable 270 extends through bar 260 and normally emerges therefrom through slots 264 and 265, and is adjustably secured to lower bars 186 and 203 by clamp 272 and 273 on said bars respectively. In this example, cable 270 extends upwardly along vertical supports 276 and 277, and extends between the upper ends of these supports to act as a safety cable 278. The ends of this cable have a hook and loop connecting arrangement 279. It will be noted that supports 276 and 277 project above the level of lines or cables 12 and 13 so that safety cable 278 extends from one support to the other above the level of these lines.

Pressure bar or tube 261 is formed in exactly the same manner as bar 260, and is carried by a cable 282 clamped to side bars 186 and 203, and extending upwardly along vertical supports 284 and 285 and having its ends releasably connected together to form a safety cable 286.

Figure 14:
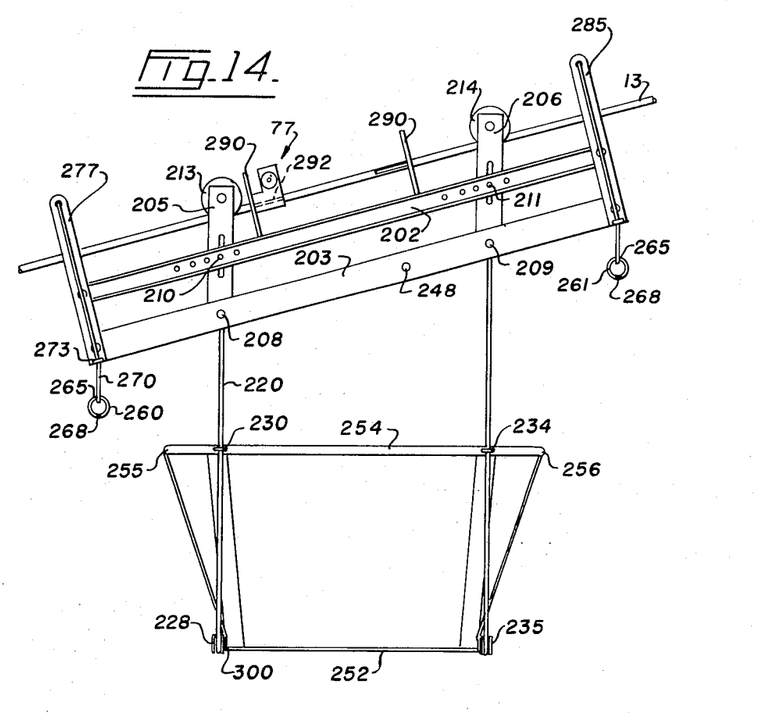
FIG. 14 is a side elevation of the skip of FIG. 13 on the inclined lines.
Figure 15:
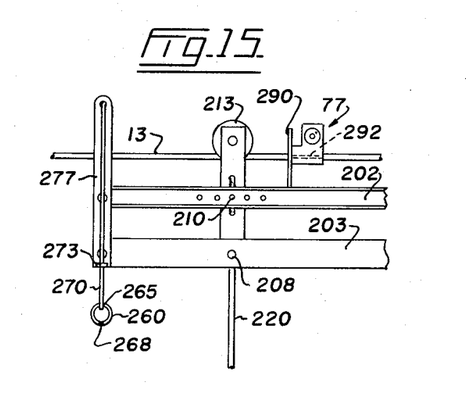
FIG. 15 is a fragmentary side elevation of this skip on horizontal lines.
Figure 16:
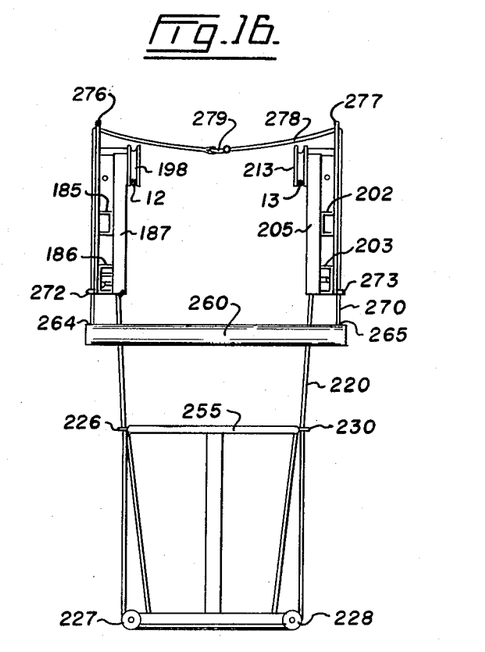
FIG. 16 is an end elevation of the skip of FIG. 13.
Figure 17:
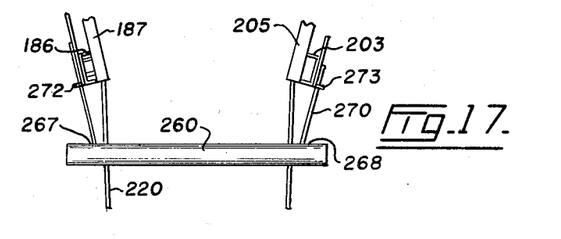
FIG. 17 is a fragmentary end elevation of the latter skip, showing a spacer bar rotated from the position shown in FIG. 15.

Brakes 76 and 77 of the types used in skip 10 are provided for skip 175. As these brakes having to be properly positioned relative to cables 12 and 13, and as upright arms 187, 205, 188 and 206 change their angular positions relative to the cables, the brakes are not mounted on these arms as in skip 10, but are mounted on standards 290 fixedly secured to upper side bars 185 and 202 adjacent the respective upright arms, said standards extending upwardly at right angles to the side bars. FIG. 14 clearly shows standard 290 for brake 77 adjacent supporting arm 205. A shaft 292 removably connects the brake to the adjacent standard 290.

Skip 175 is moved along lines 12 and 13 and operates very much in the same manner as skip 10. The main difference is that when it is desired to pass the pulleys of the skip past some line hardware, the operator sits on either pressure bar 260 or 261, depending upon the direction of movement of the skip, in order to utilize his weight with as much leverage as possible to help lift the opposite end of the skip. For example, if it is desired to lift pulleys 199 and 214 over a horizontal spacer connected to lines 12 and 13, the operator would sit on bar 260 to use his weight to lift these pulleys off the lines. After pulling the skip forwardly, he allows pulleys 199 to return to the lines. Then he moves to the opposite end of the skip, sits on bar 261 and repeats the process by lifting pulleys 198 and 213 off the lines.

If it is necessary to spread the pulleys apart when they are lifted off the lines, as is necessary when passing vertical supports for the lines, the operator would first shift supporting cable 270 out of slots 264 and 265 of bar 260 and place it in slots 267 and 268 of said bar, it only being necessary to rotate the bar around the portion of the cable extending therethrough to be able to do this. Now when he sits on the pressure bar, cable 270 tends to swing the adjacent ends of side members 186 and 203 towards each other, causing the opposite ends of said side members and, consequently, pulleys 199 and 214 to move away from each other as the latter ends are raised. After passing the line hardware, the operator pulls the side members towards each other and replaces pulleys 199 and 214 on the line.

FIG. 14 shows skip 175 on inclined lines. At this time, the vertical supporting arms are released from upper side bars 185 and 202 so that said arms remain in their vertical positions while frame 178 is substantially parallel with the inclined lines. When the upper pulleys are being lifted off the lines, the balance point 300 is directly below pulleys 198 and 213 which remain on the lines. As it can be comparatively difficult to lift the upper pulleys from the lines at this time, the operator's weight on pressure bar 260 greatly aids this operation. His weight is spaced outwardly from the vertical plane through balance point 300 and the pulleys immediately above it, thus providing as much leverage as possible under the circumstances.

I claim:

1. A skip for moving one or more men along line means including one or more cables suspended from supports for repairing, maintenance and other purposes, comprising supporting means, pulley means on said supporting means and adapted to ride on and to be lifted off the line means when the skip is in use, an open cage for carrying an operator, said cage having a floor and protective end and side walls, cable means on the supporting means and connected to the cage to carry said cage below the line means and with the floor thereof positioned so that a man standing on said floor can grasp and work around said line means, and adjusting means manipulated by the operator to shorten and lengthen said cable means to maintain the cage substantially level when the line means is not level.

2. A skip as claimed in claim 1 including brake means on said supporting means operable to grip said cable means and prevent movement of the skip along the cable means.

3. A skip as claimed in claim 1 in which said supporting means comprises a frame having spaced-apart side members, and including a yoke above the frame and extending laterally from one side member to the other member and connected thereto adjacent each end of the skip, and an arm extending upwardly from each yoke, said pulley means being a pulley mounted on each of said arms.

4. A skip as claimed in claim 1 including at least one safety strap extending freely over said line means and releasably connected to the supporting means.

5. A skip as claimed in claim 1 in which said pulley means comprises at least one pulley adjacent each of opposite ends of the supporting means and the cage.

6. A skip as claimed in claim 5 in which each end of the cage projects longitudinally beyond the adjacent pulley, whereby when the operator places his weight on said each end of the cage, his weight helps him to tip the cage to raise the cage end opposite said each end upwardly relative to the line means to lift the pulley adjacent said raised end off the line means.

7. A skip as claimed in claim 1 in which said supporting means comprises two side members movable towards and away from each other, and said pulley means comprises pulleys on each side member, the pulleys of each side member riding on a different cable of said line means from the cable on which the pulleys of the other side member ride.

8. A skip as claimed in claim 7 including brake means on each side member operable to grip the adjacent cable to prevent movement of the skip therealong.

9. A skip as claimed in claim 7 in which said adjusting means comprises hook means for each cable means connectable to different anchor means on said supporting means to lengthen and shorten said cable means to maintain the cage level both longitudinally and laterally when said cables are not level.

10. A skip for moving one or more men along line means including one or more cables suspended from supports for repairing, maintenance and other purposes, comprising a supporting frame, an open cage for carrying an operator, said cage having a floor and protective end and side walls, bearings on the supporting frame, cable means extending over said bearings and connected to the cage to support the latter below the line means and with the floor thereof positioned so that a man standing on said floor can grasp and work around said line means, adjusting means on the supporting frame and connected to said cable means, said adjusting means being manipulatable by the operator to shorten and lengthen the cable means to tilt the cage relative to the supporting frame, and pulley means connected to said supporting frame and adapted to ride on and to be lifted off said line means when the skip is in use.

11. A skip as claimed in claim 10 in which said pulleys are mounted adjacent each of opposite ends of the supporting frame, and including pulleys on the cage adjacent opposite ends thereof and around which said cable means extends.

12. A skip as claimed in claim 11 in which said operating means comprises hook means connected to said cable means and selectively connectable to any one of a plurality of anchor means on said supporting frame.

13. A skip as claimed in claim 12 in which said cable means comprises two cables, one adjacent each end of the skip, and said adjusting means comprises at least one hook connected to each of said cables, and a plurality of anchors spaced apart longitudinally of the supporting frame to which the hooks of the cables can selectively be connected.

14. A skip as claimed in claim 10 in which said supporting means comprises a pair of longitudinally-extending side members movable towards and away from each other, some of the supporting frame pulleys being on each of said side members.

15. A skip as claimed in claim 10 including brake means adjacent an end of the supporting frame operable to grip said line means to prevent movement of the skip therealong.

16. A skip for moving one or more men along line means including one or more cables suspended from supports, for repairing, maintenance and other purposes, comprising an open cage for carrying an operator, said cage having a floor and protective end and side walls, and pulley means connected to the cage adjacent each of opposite ends thereof and adapted to ride on and to be lifted off the line means and to support the cage below the line means and with the floor thereof positioned so that a man standing on said floor can grasp and work around said line means, at least one end of the cage projecting longitudinally beyond the adjacent pulley means, whereby when the operator places his weight on said projecting cage end, his weight helps him to tip the cage to raise the pulley means adjacent the opposite cage end up off the line means so the cage can be moved to shift the last-mentioned pulley means past an obstruction.

17. A skip as claimed in claim 16 including brake means near at least one of said pulley means operable to grip said line means to prevent movement of the skip therealong.

18. A skip as claimed in claim 16 including at least one safety strap extending freely over said line means and releasably connected to the cage.

19. A skip as claimed in claim 16 including a supporting frame to which said cage is connected, said pulley means being mounted on the supporting frame.

20. A skip as claimed in claim 19 in which said supporting frame has space-apart side members, and including a yoke above the frame and extending laterally from one side member to the other member and connected thereto adjacent each end of the skip, and an arm extending upwardly from each yoke, said pulley means being a pulley mounted on each of said arms.

21. A skip as claimed in claim 19 in which said cage is connected to the supporting frame by cable means, and including adjusting means on the supporting frame and connected to said cable means, said adjusting means being manipulatable by the operator to shorten and lengthen the cable means to tilt the cage relative to the supporting frame.

22. A skip as claimed in claim 21 in which said operating means comprises a hook and anchor arrangement between the supporting frame and the cable means.

23. A skip as claimed in claim 21 in which said supporting frame comprises a pair of longitudinally extending side members movable towards and away from each other, some of said pulley means being on each of said side members.

24. A skip for moving one or more men along line means including one or more cables suspended from supports for repairing, maintenance and other purposes, comprising a pair of side supporting members, bearing on the side members adjacent end thereof, an open cage for carrying an operator, said cage having a floor and protective end and side walls, pulleys on the cage adjacent its ends, a cable extending over the side member bearings and around the cage pulleys adjustably to connect the cage to the side members and to support the cage below the line means and with the floor thereof positioned so that a man standing on said floor can grasp and work around said line means, adjusting means on the side members manipulated by the operator to shorten and lengthen the cable to tilt the cage relative to the side members, and supporting pulleys mounted on both of the side members and adapted to ride on and to be lifted off said cables when the skip is in use.

25. A skip as claimed in claim 24 including brakes on said side members operable to grip said cables to prevent movement of the skip therealong.

26. A skip as claimed in claim 24 in which there is a supporting pulley adjacent each end of each side member and spaced inwardly from said each end, and each supporting pulley is mounted on its side member by means of an arm projecting upwardly from said side member.

27. A skip as claimed in claim 24 including at least one safety strap extending freely over said line means and releasably connected to said side supporting members.

28. A skip for travelling along and moving one or more men along a pair of laterally-spaced cables suspended from supports for repairing, maintenance and other purposes, comprising a supporting frame having a plurality of supporting arms projecting upwardly from each of two side members thereof, said arms being spaced inwardly from ends of the frame, pulleys mounted on the arms adapted to ride on and to be lifted off said cables when the skip is in use, a cage positioned below the frame, said cage having a floor and end and side walls, and longitudinally-adjustable cable means connecting the cage to the frame to support the cage below said cables with the floor thereof positioned so that a man standing on said floor can grasp and work around said cables.

29. A skip as claimed in claim 28 including bearings on the supporting frame, and pulleys on the cage adjacent its ends, said cable means extending over said bearings and around said pulleys.

30. A skip as claimed in claim 28 in which each of said arms is pivotally connected to the supporting frame for swinging movement longitudinally of the latter.

31. A skip as claimed in claim 30 including means for securing each of said arms in any of a plurality of angular positions relative to the supporting frame.

32. A skip as claimed in claim 28 in which the side members of the supporting frame are movable towards and away from each other.

33. A skip as claimed in claim 32 including a pressure bar suspended from each end of the supporting frame extending transversely thereof and spaced outwardly from the adjacent end of said cage, whereby an operator in the skip can sit on said pressure bar to help him raise the opposite end of the supporting frame.

34. A skip as claimed in claim 33 in which each pressure bar is suspended by a supporting cable extending through the bar and having ends connected to the supporting frame, and each bar has a pair of short slots opening inwardly from opposite ends thereof, and a pair of longer slots opening outwardly from said opposite ends, said supporting cable selectively extending through said pair of short slots or said pair of longer slots.

References Cited
UNITED STATES PATENTS

| | | | |
|---|---|---|---|
| 328,899 | 10/1885 | Morrison | 105—149 X |
| 342,757 | 5/1886 | Morrison | 105—149 X |
| 636,605 | 11/1899 | Wilson | 104—113 X |
| 413,389 | 10/1889 | Cruikshank | 105—149 |
| 904,525 | 11/1908 | Frederick | 105—148 X |
| 909,794 | 1/1909 | Henry | 105—149 |
| 1,051,093 | 1/1913 | Faukes et al. | 105—149 X |
| 1,358,325 | 11/1920 | Osze | 182—144 |

GERALD M. FORLENZA, Primary Examiner

H. BELTRAN, Assistant Examiner

U.S. Cl. X.R.

104—95, 112; 105—149, 154; 182—19, 37, 144; 272—24, 38, 85